F. M. WADE.
COLLAPSIBLE BOX.
APPLICATION FILED JULY 13, 1908.

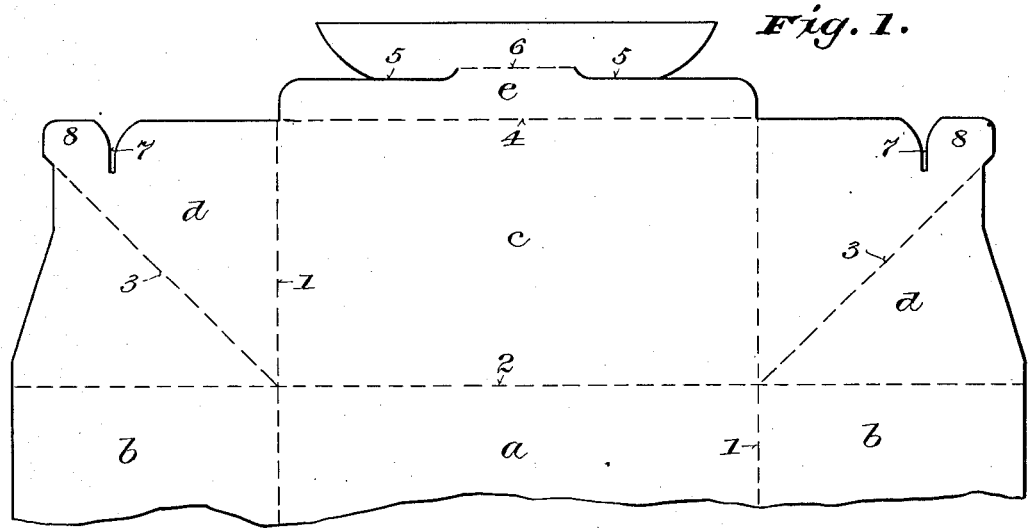
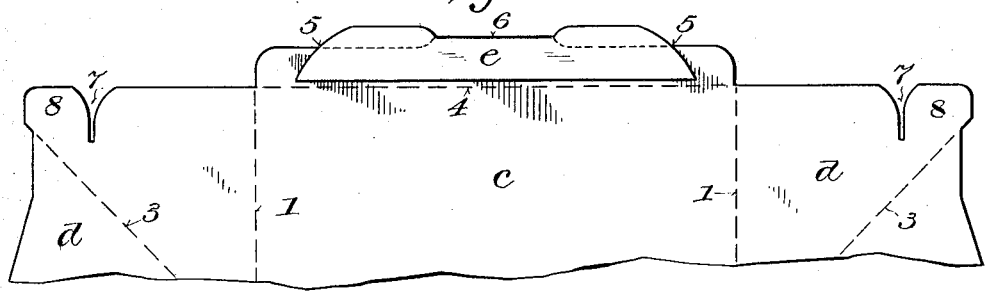
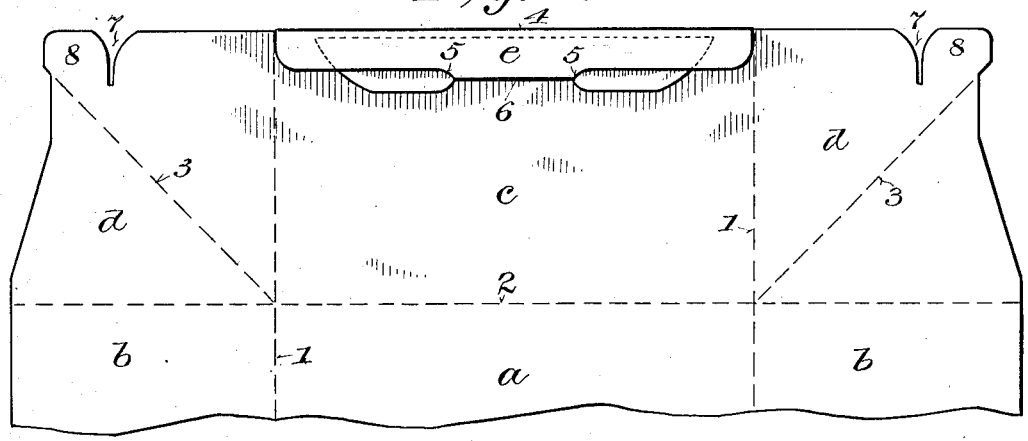

916,509.

Patented Mar. 30, 1909.
5 SHEETS—SHEET 2.

Witnesses:

Inventor:
Frank M. Wade,
By Winkler, Flanders, Bottum & Fawsett
Attorneys.

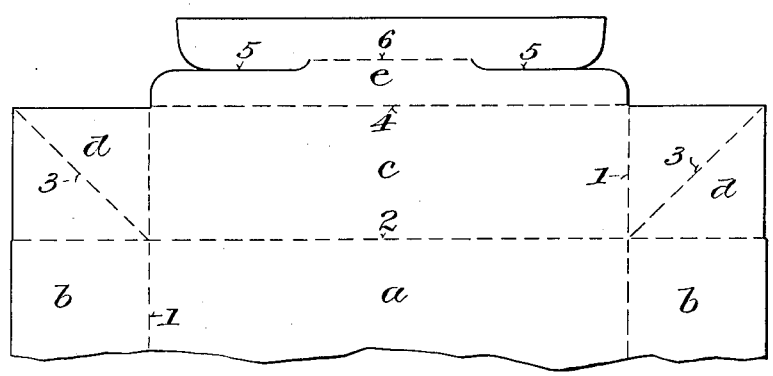
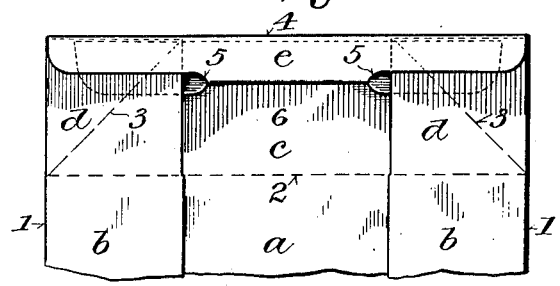
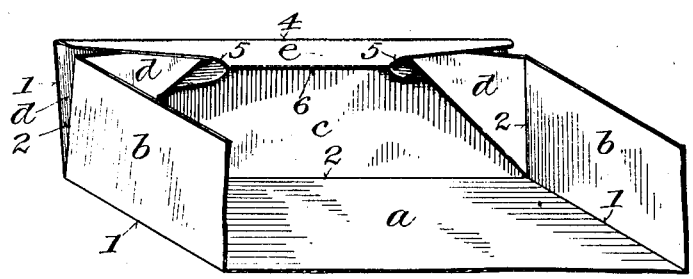
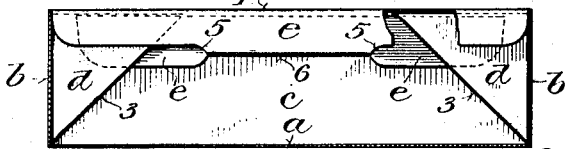

F. M. WADE.
COLLAPSIBLE BOX.
APPLICATION FILED JULY 13, 1908.
916,509.
Patented Mar. 30, 1909.
5 SHEETS—SHEET 4.
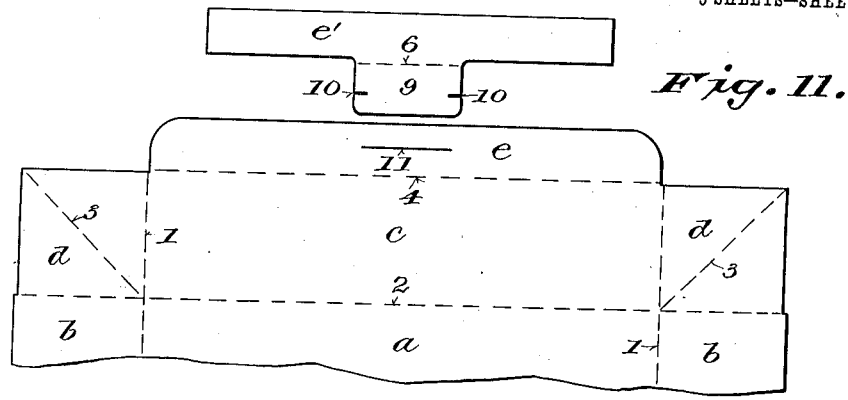
Fig. 11.
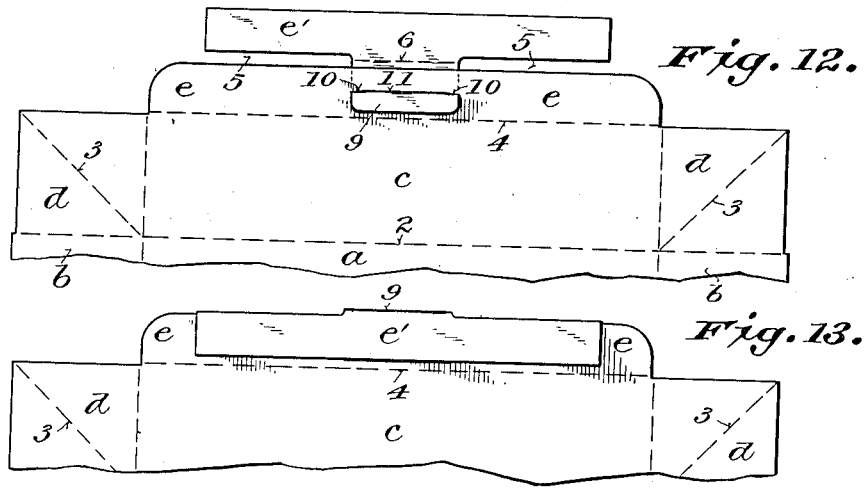
Fig. 12.
Fig. 13.
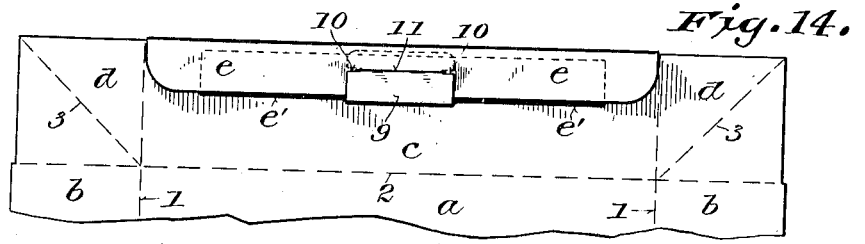
Fig. 14.
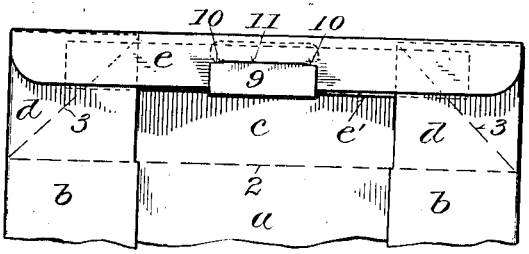
Fig. 15.
Witnesses:
Inventor:
Frank M. Wade,
By Whitten Honders Bottum & Fowlett
Attorneys.

F. M. WADE.
COLLAPSIBLE BOX.
APPLICATION FILED JULY 13, 1908.
916,509.
Patented Mar. 30, 1909.
5 SHEETS—SHEET 5.
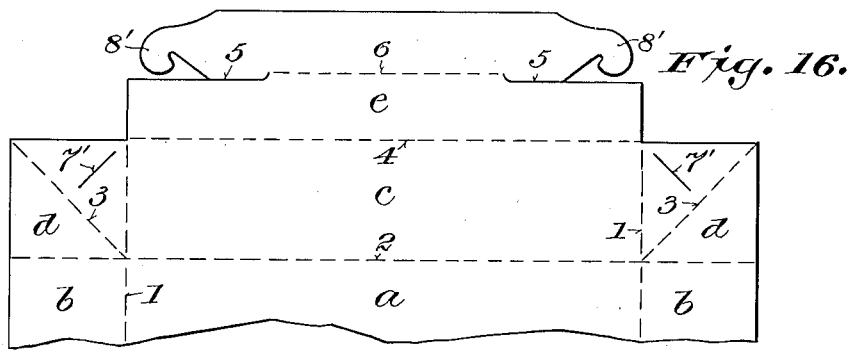
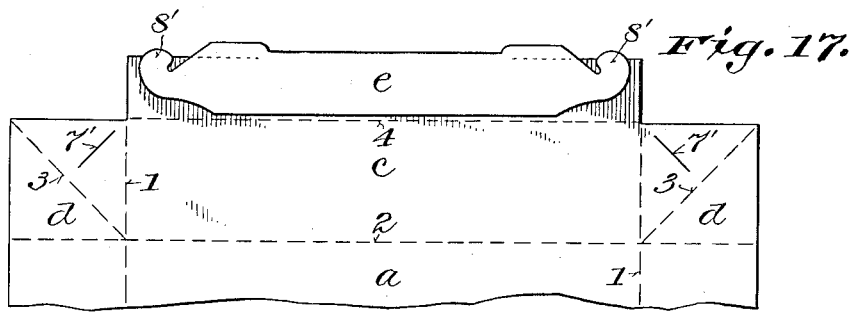
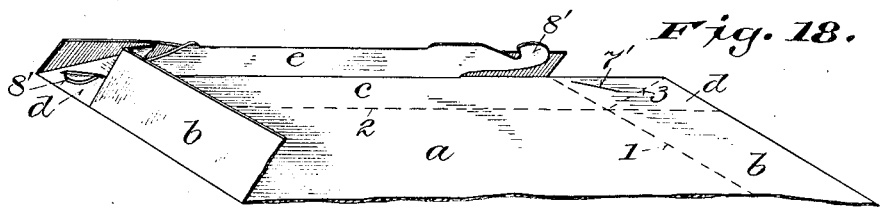
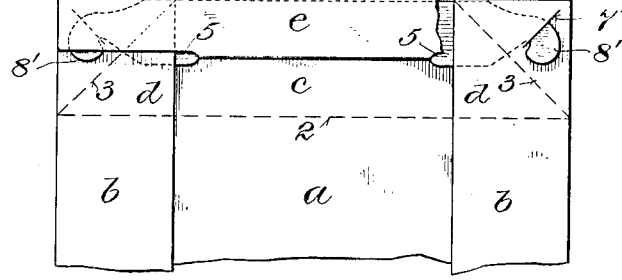
Witnesses:
Fred Pulm
Chas. L. Goss.
Inventor:
Frank M. Wade
By Winkler Flanders Bottum & Hewett
Attorneys.

UNITED STATES PATENT OFFICE.

FRANK M. WADE, OF WAUWATOSA, WISCONSIN, ASSIGNOR TO A. GEO. SCHULZ CO., OF MILWAUKEE, WISCONSIN, A CORPORATION OF WISCONSIN.

COLLAPSIBLE BOX.

No. 916,509.  Specification of Letters Patent.  Patented March 30, 1909.

Application filed July 13, 1908. Serial No. 443,234.

*To all whom it may concern:*

Be it known that I, FRANK M. WADE, a citizen of the United States, residing at Wauwatosa, in the county of Milwaukee and State of Wisconsin, have invented certain new and useful Improvements in Collapsible Boxes, of which the following is a specification, reference being had to the accompanying drawing, forming a part thereof.

This invention relates to folding boxes made of heavy paper, paper board or similar material. Its main objects are to produce a light, strong box which can be economically made, which will fold, when not in use, into small compass for storage and transportation, which can be easily unfolded and set up for use and will retain its shape without the aid of staples or other extra fastenings; and generally to improve the construction and increase the convenience of boxes of this class.

It consists in certain novel features of construction as hereinafter particularly described and defined in the claims.

In the accompanying drawing like characters designate the same parts in the several figures.

Figure 4:
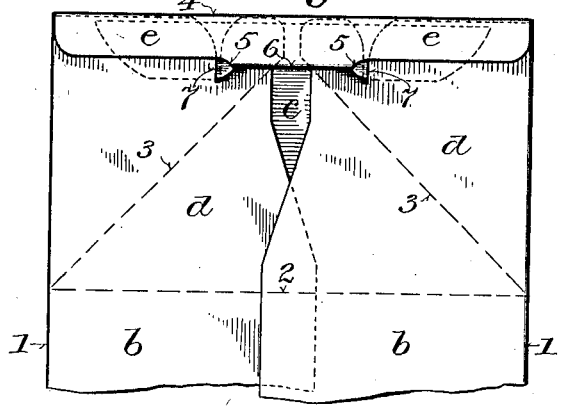
Figure 5:
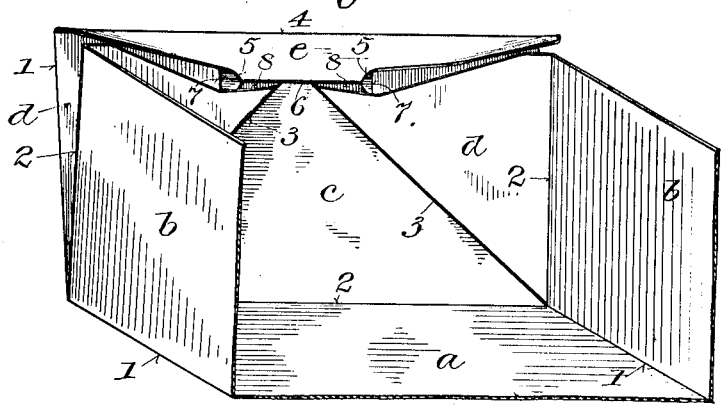
Figure 6:
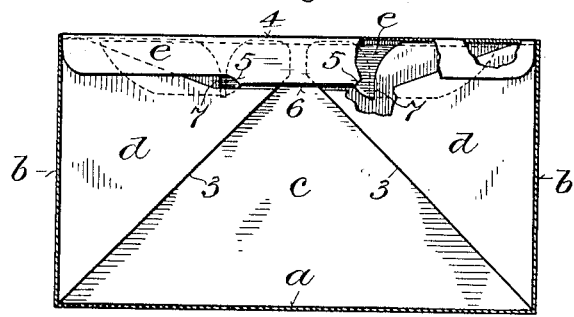

Figure 1 is a plan view of one end of the blank as cut and scored according to the present invention for a deep box, the side sections of which are each about one half the width of the bottom or main section: Fig. 2 is a similar view showing the binding flap partially folded; Fig. 3 is a similar view showing the flap completely folded; Fig. 4 is a similar view showing one end of the box in its collapsed or knock-down condition or form suitable for storage or shipment, and ready to be unfolded and set up for use; Fig. 5 is a sectional and perspective view of one end of the box showing the box unfolded and partially set up, the inner fold of the binding flap being raised at the corners to permit the inner folds of the corner sections to pass under them; Fig. 6 is a sectional view of one end of the box completely folded; Figs. 7, 8, 9 and 10 are views like or similar to Figs. 1, 4, 5 and 6, of a slightly modified construction for covers or shallower boxes; Figs. 11, 12, 13, 14 and 15 are similar views of another modification; and Figs. 16, 17, 18 and 19 are similar views of still another modification.

Referring to Figs. 1 to 6 inclusive, showing a construction suitable for deep boxes, the blank is cut and scored as shown in Fig. 1, both ends being alike. The score lines or creases 1 and 2 on which the blank is folded, define the bottom or main section *a*, four side walls or sections *b* and *c*, and four approximately square corner sections *d*, joining the ends of the side sections along the score lines 1 and 2. The corner sections *d* are scored on the diagonal lines 3, and fold inwardly into substantially triangular form against opposite end or side sections *c*. The end or opposite side sections *c* are extended beyond the corner sections *d* to form two-ply binding flaps *e*, which fold inwardly against the end sections *c* on the score lines or creases 4. The outer part or fold of each binding flap *e*, which is partially severed from the inner part or fold by slits 5, is first folded inwardly against the other part, as shown in Fig. 2, on the score line or crease 6, parallel with the score lines 2 and 4. The slits 5, which are in the main substantially parallel with the score line 4, and extend from the ends of the score line 6 through the ends of the flap, are preferably curved or offset at their inner ends away from said score line, so that the edges of the two parts or folds of the flap along the slits will be separated, or one will project beyond the other when the flap is folded, as shown in Figs. 2 and 3. The ends of the outer part of each flap are preferably cut on curves or obliquely, so as to form outwardly divergent openings into the slits 5. By so forming the flaps and the slits therein, the tucking of the folds of the corner sections between the folds of the flaps and the interlocking of the parts are facilitated. The triangular parts of the corner sections *d* adjoining the end sections *c* are formed through their edges with slits or indentations 7, substantially parallel with the score lines 1, and preferably having flaring or divergent openings. These slits or indentations form ears or tabs 8 at the corners of the blank. The binding flaps *e* being folded inwardly upon themselves and against the end sections c, as shown in Figs. 2 and 3, the side sections b with the corner sections d, are folded inwardly against the main or bottom section a and the end sections c, as shown in Fig. 4, the free edges of the corner sections in line with the score lines 4 being tucked into the slits 5 between the folds of the flaps e, and the ears or tabs 8 being tucked underneath both folds of said flaps. The outer or underlying folds of the flaps e next to the end sections c, entering the slits or notches 7 and interlocking with the outer folds of the corner sections, help to retain the corner sections d in engagement with the infolded flaps and to hold the parts thus connected in their proper relations to one another when the box is collapsed or folded flat, as shown in Fig. 4. In this flat form or condition, the boxes may be conveniently piled one upon another in small compass for shipment or storage.

To open and set the boxes up for use, the side sections b are turned upwardly and outwardly, thereby folding the corner sections upon the diagonal lines 3, and drawing the end sections c up into place, as shown in Fig. 5. The edges of the triangular parts of the corner sections d adjoining the side sections b being tucked through the slits 5 between the folds of the flaps e, as shown in Fig. 6, thus secure the upturned side sections b and end sections c together at the corners and hold the box in shape for use without staples or other extraneous fastenings.

To collapse and fold the box into the knock-down form in which it is shown in Fig. 4, the triangular parts of the corner sections d joining the side sections b are withdrawn from between the folds of the binding flaps e by pressing or drawing the side sections toward each other or by pressing or drawing the end sections outwardly. When the inner folds of the corner sections have been disengaged from the binding flaps, the side sections b with the corner sections d will fold inwardly flat against the main or bottom section a and the end sections c, and the end sections will swing simultaneously outward into the plane of the main or bottom section a. For covers or shallow boxes, the corner sections d are made square and the slits or notches 7 are omitted, as shown in Figs. 7 to 10 inclusive. In other respects the construction of the box and the manipulation in unfolding and folding the same, are substantially the same as for the deeper boxes hereinbefore described.

In setting up either form of the box as illustrated by Figs. 5 and 9, the free corners of the inner folds of the binding flaps e adjoining the end sections c, are bent inwardly and upwardly to allow the upper edges of the triangular parts of the corner sections d adjoining the side sections b to pass into place through the slits 5 between the folds of the flaps e and to fold flat against the other parts of said corner sections adjoining the end sections c. The ends of the inner folds of the flaps e being released, spring back into place over both parts of the folded corner sections, as shown in Figs. 6 and 10, and thus securely lock them together against the end sections and hold the box in shape for use, without other fastenings. The binding flaps e also serve to hold the box folded flat or in its knock-down form, as shown in Figs. 4 and 8.

The projection of the outer or underlying folds of the flaps e beyond the inner or overlying folds thereof and the consequent separation of the edges of the two folds along the slits 5, as shown in Figs. 3, 4, 8 and 10, facilitate the insertion of the edges of the corner sections between said folds, particularly in converting the blank into the flat or collapsed form of the box shown by Figs. 4 and 8. Boxes of this kind may each be made in a single piece or from a one-piece blank, as shown in Figs. 1 and 7, or if desired on account of economy in material or for any other reason, each blank may be pieced or made of more than one part, as shown for example, by Figs. 11 to 15 inclusive. In the present instance the folds or parts of the binding flaps at the ends of the box, instead of being made in one piece, as shown in the preceding figures of the drawing, are each made in two parts, the outer fold or part e' having, as shown in Fig. 11, a tongue 9 which is formed with slits or notches 10 in its opposite edges, and which, as shown in Fig. 12, is adapted to be tucked through and held in a slit 11 cut in the inner fold or part of the flap parallel with the score line 4. The width of the tongue 9 being somewhat greater than the length of the slit 11, the slits or notches 10 interlock with the inner fold or part of the flap at the ends of the slit 11 and permanently hold the parts together, it being unnecessary to separate them after they have once been connected. When they are thus joined, the adjacent edges of the folds or parts of the flaps form the slits 5, as shown in Fig. 12, to receive and hold the corner sections d both in the knock-down or collapsed and in the set-up conditions of the box, the same as in the one-piece forms hereinbefore described.

By the construction last described, the body of the blank is somewhat shortened, and the outer folds or parts e' of the flaps may be made from scraps or comparatively narrow strips of like or similar material. Blanks so made are folded as shown in Figs. 13, 14 and 15, into the knock-down or collapsed form from which they can be readily unfolded and set up for use, as hereinbefore explained in connection with Figs. 4 to 6 and 8 to 10 inclusive, the outer parts e' of the flaps folding on the score lines 6 across their tongues 9.

The construction shown in Figs. 11 to 15 inclusive is intended for shallow boxes or covers, but is equally adapted to deeper boxes, the sides and corner sections $b$, $c$ and $d$ being made as shown in Figs. 1, 2 and 3.

Referring to Figs. 16 to 19 inclusive, showing a modification of the auxiliary locking device illustrated in Figs. 1 to 6 inclusive, the triangular parts of the corner sections $d$ are formed with oblique slits 7' and the outer parts of the binding flaps $e$ adjoining the end or side sections $c$ are formed at the ends with notched or hooked ears 8' which when said flaps and the side sections $b$ with the corner sections $d$ are folded inwardly to produce a box in collapsed or knock-down form, are tucked through the slits 7', as shown in Figs. 18 and 19. When the notches of the ears 8' are engaged with the inner ends of the slits 7', the corner sections $d$ passing through the slits 5 and lying between the folds of the binding flaps $e$, the end or side sections $c$ are securely locked to the outer triangular parts of the infolded corner sections $d$, as shown in Fig. 19. This form of locking device is applicable to deep as well as shallow boxes and covers, and serves with the binding flaps $e$ to securely hold the boxes or covers both in their collapsed or knock-down and in their set-up form.

From the knock-down form shown in Fig. 19, the box is unfolded and set up as shown by Figs. 5 and 9, the ends of the inner parts or folds of the flaps $e$ being bent inwardly and upwardly while the triangular parts of the corner sections $d$ adjoining the side sections $b$ being folded outwardly on the score lines 3, are tucked through the slits 5 between the folds of said flaps $e$. These boxes may be supplied to users or dealers and stored or shipped completely unfolded or in the blank form as shown in Figs. 1, 7, 12 and 16, since they can be readily converted from that form into the flat folded or collapsed form shown in Figs. 4, 8, 15 and 19, and from the latter form into the set-up or box form shown in Figs. 6 and 10, by the simple manipulations hereinbefore explained, which do not involve the use of tools or the application of extra fastenings.

I claim:

1. A collapsible box comprising a main and four side sections, four diagonally infolding corner sections and two-ply infolding binding flaps on two opposite side sections, having slits through the ends approximately parallel with their folding lines, the upper edges of the folded corner sections being adapted to be tucked into said slits between the folds of the flaps when the box is set up, substantially as described.

2. A collapsible box comprising a main and four side sections, four diagonally infolding corner sections and two-ply infolding binding flaps joined to opposite side sections and having slits through their ends and between their folds approximately parallel with their folding lines, the free edges of the infolded corner sections being adapted to be tucked through said slits and held between the folds of the binding flaps, and the flaps and the corner sections having interlocking slits and ears, substantially as described.

3. A collapsible box comprising a main and four side sections, four diagonally infolding corner sections, and on two opposite side sections two-ply infolding binding flaps having slits through the ends approximately parallel with their folding lines and notched ears at the ends of their outer folds, the upper edges of the folded corner sections being adapted to be tucked into said slits between the folds of the flaps, and the outer folds of said corner sections having slits to receive and interlock with the ears on said binding flaps, substantially as described.

4. A collapsible box comprising a main and four side sections, four diagonally infolding corner sections joined to the ends of the side sections along folding lines, and two-ply infolding binding flaps joined along folding lines to the outer edges of two opposite side sections and having slits through their ends approximately parallel with their folding lines to receive and hold one or both folds of said corner sections, substantially as described.

5. A collapsible box comprising a main and four side sections, four diagonally infolding corner sections joined on folding lines to the ends of the side sections, and two-ply infolding binding flaps joined on folding lines to the outer edges of two opposite side sections and having slits extending from and out of line with the score lines between the folds of the flaps through the ends of the flaps, so that the edges of the parts of each flap next to the slits therein are separated and extend one beyond the other when the flap is folded, the edges of the corner sections being adapted to be tucked through said slits and held between the folds of the flaps, substantially as described.

6. A collapsible box comprising a main and four side sections, four diagonally infolding corner sections joined to the ends of the side sections on folding lines and two-ply infolding binding flaps joined on folding lines to the outer edges of two opposite side sections and having slits through their ends through which the outer edges of the folded corner sections are adapted to be tucked between the folds of said flaps to hold the parts in place when the box is set up, substantially as described.

7. A collapsible box formed in one piece and comprising a main and four side sections, four diagonally infolding corner sections joined to the ends of the side sections along folding lines and two-ply infolding binding flaps joined along folding lines to the outer edges of two opposite side sections and having slits through their ends approximately parallel with their folding lines to receive and hold one or both folds of said corner sections, substantially as described.

In witness whereof I hereto affix my signature in presence of two witnesses.

FRANK M. WADE.

Witnesses:
  CHAS. L. GOSS,
  ALICE E. GOSS.